United States Patent
Chiang et al.

(10) Patent No.: US 12,332,001 B1
(45) Date of Patent: Jun. 17, 2025

(54) METHOD OF MANUFACTURING HEAT DISSIPATION MODULE

(71) Applicant: Jentech Precision Industrial Co., LTD., Taoyuan (TW)

(72) Inventors: Chun-Yi Chiang, Taoyuan (TW); Yi-Sheng Chiu, Taoyuan (TW); Chiao Hsiang Chang, Taoyuan (TW)

(73) Assignee: Jentech Precision Industrial Co., LTD., Taoyuan (TW)

( * ) Notice: Subject to any disclaimer, the term of this patent is extended or adjusted under 35 U.S.C. 154(b) by 0 days.

(21) Appl. No.: 18/741,828

(22) Filed: Jun. 13, 2024

(30) Foreign Application Priority Data

May 8, 2024 (TW) ................................. 113117079

(51) Int. Cl.
  F28F 13/18 (2006.01)
  B23P 15/26 (2006.01)
  F28D 21/00 (2006.01)

(52) U.S. Cl.
  CPC .............. F28F 13/18 (2013.01); B23P 15/26 (2013.01); F28D 2021/0028 (2013.01); F28F 2245/00 (2013.01); F28F 2255/08 (2013.01); F28F 2275/06 (2013.01); Y10T 29/4935 (2015.01)

(58) Field of Classification Search
  CPC .............................. B23P 15/26; Y10T 29/4935
  See application file for complete search history.

(56) References Cited

U.S. PATENT DOCUMENTS

| | | | | |
|---|---|---|---|---|
| 6,853,068 | B1* | 2/2005 | Djekic | H01L 23/4093 |
| | | | | 257/713 |
| 7,416,922 | B2* | 8/2008 | Houle | H01L 23/42 |
| | | | | 257/E23.087 |
| 11,482,465 | B2* | 10/2022 | Yu | H01L 23/481 |
| 11,705,381 | B2* | 7/2023 | Chen | H01L 23/42 |
| | | | | 257/713 |
| 2005/0138800 | A1 | 6/2005 | Mayer | |
| 2011/0096507 | A1* | 4/2011 | Deram | H01L 23/42 |
| | | | | 228/141.1 |

FOREIGN PATENT DOCUMENTS

| | | | | |
|---|---|---|---|---|
| CN | 114901414 A | * | 8/2022 | ............. B23K 1/008 |
| TW | 200630025 A | | 8/2006 | |
| TW | 200832636 A | | 8/2008 | |
| TW | 201501257 A | | 1/2015 | |
| TW | 202247366 A | | 12/2022 | |

OTHER PUBLICATIONS

English Machine Translation of CN-114901414-A (Year: 2022).*

* cited by examiner

Primary Examiner — Sarang Afzali
(74) Attorney, Agent, or Firm — CKC & Partners Co., LLC

(57) ABSTRACT

A method of manufacturing heat dissipation module is provided. The method includes: providing a main body; disposing a thermal interface material (TIM) layer on the main body; applying a first pressure to a surface of the TIM layer away from the main body in stages regionally; and applying a second pressure to an entire portion of the surface at a same time.

21 Claims, 4 Drawing Sheets

METHOD OF MANUFACTURING HEAT DISSIPATION MODULE

RELATED APPLICATIONS

This application claims priority to Taiwan Application Serial Number 113117079, filed May 8, 2024, which is herein incorporated by reference in its entirety.

BACKGROUND

Technical Field

The present disclosure relates to methods of manufacturing a heat dissipation module.

Description of Related Art

With the advancement of electronic technology, the development of electronic products is regarded to be very rapid. Correspondingly, in order to cope with the improvement in the functions of electronic products, the requirements for heat dissipation in electronic products have become higher and higher. Therefore, the application of heat dissipation modules has also become more and more popular.

In practical applications, heat spreaders, vapor chambers or cold plates can effectively take away the internal heat generated by electronic products during operation. However, how to further improve the effect of heat dissipation on electronic products to improve the operating quality of electronic products is undoubtedly an important issue that the industry highly concerns.

SUMMARY

A technical aspect of the present disclosure is to provide a method of manufacturing heat dissipation module, which can enhance the fitness of contact between the thermal interface material layer and the main body.

According to an embodiment of the present disclosure, a method of manufacturing heat dissipation module includes: providing a main body; disposing a thermal interface material (TIM) layer on the main body; applying a first pressure to a surface of the TIM layer away from the main body in stages regionally; and applying a second pressure to an entire portion of the surface at a same time.

In one or more embodiments of the present disclosure, the surface is divided into a plurality of regions. The procedure of applying the first pressure includes: applying the first pressure to the regions one by one.

In one or more embodiments of the present disclosure, the procedure of applying the first pressure includes: rolling on the surface by a roller to apply the first pressure to the surface regionally.

In one or more embodiments of the present disclosure, the procedure of applying the first pressure includes: adjusting the first pressure applied to the surface.

In one or more embodiments of the present disclosure, the procedure of applying the second pressure includes: pressing on the main body by a first pressing tool; and pressing on the entire portion of the surface by a second pressing tool, in which the second pressing tool at least partially aligns with the first pressing tool.

In one or more embodiments of the present disclosure, the method further includes: disposing a flux between the main body and the TIM layer.

In one or more embodiments of the present disclosure, the procedure of applying the second pressure includes: heating up the flux.

In one or more embodiments of the present disclosure, the procedure of heating up the flux includes: heating up the flux to a temperature, in which a range of the temperature is between 145 and 170 degree Celsius.

In one or more embodiments of the present disclosure, the procedure of heating up the flux includes: maintaining the temperature within a time period, in which a range of the time period is between 2 and 3 minutes.

In one or more embodiments of the present disclosure, the procedure of applying the second pressure includes: applying the second pressure in a chamber. The method further includes: providing a working gas in the chamber.

In one or more embodiments of the present disclosure, the working gas includes nitrogen and formic acid.

According to an embodiment of the present disclosure, a method of manufacturing heat dissipation module includes: providing a main body; disposing a flux on the main body; disposing a thermal interface material (TIM) layer on a side of the flux away from the main body; applying a first pressure to a surface of the TIM layer away from the main body in stages regionally; and applying a second pressure to an entire portion of the surface at a same time.

In one or more embodiments of the present disclosure, the surface is divided into a plurality of regions. The procedure of applying the first pressure includes: applying the first pressure to the regions one by one.

In one or more embodiments of the present disclosure, the procedure of applying the first pressure includes: rolling on the surface by a roller to apply the first pressure to the surface regionally.

In one or more embodiments of the present disclosure, the procedure of applying the first pressure includes: adjusting the first pressure applied to the surface.

In one or more embodiments of the present disclosure, the procedure of applying the second pressure includes: pressing on the main body by a first pressing tool; and pressing on the entire portion of the surface by a second pressing tool, in which the second pressing tool at least partially aligns with the first pressing tool.

In one or more embodiments of the present disclosure, the procedure of applying the second pressure includes: heating up the flux.

In one or more embodiments of the present disclosure, the procedure of heating up the flux includes: heating up the flux to a temperature, in which a range of the temperature is between 145 and 170 degree Celsius.

In one or more embodiments of the present disclosure, the procedure of heating up the flux includes: maintaining the temperature within a time period, in which a range of the time period is between 2 and 3 minutes.

In one or more embodiments of the present disclosure, the procedure of applying the second pressure includes: applying the second pressure in a chamber. The method further includes: providing a working gas in the chamber.

In one or more embodiments of the present disclosure, the working gas includes nitrogen and formic acid.

The above-mentioned embodiments of the present disclosure have at least the following advantages:

(1) During the first stage of pre-compression, the first pressure is being applied to the surface of the TIM layer away from the main body in stages regionally, such that any void(s) formed between the TIM layer and the main body due to improper contact can be pushed away.

Consequently, the fitness of contact between the TIM layer and the main body is enhanced.

(2) During the second stage of final compression, a second pressure is applied to the entire portion of the surface of the TIM layer, such that the fitness of contact between the main body and the TIM layer is effectively enhanced.

(3) During the second stage of final compression, the main body is not in contact with any printed circuit board as in the traditional approach. This means, the flux is not located in the confined space formed by the main body and the printed circuit board, which facilitates the gas produced from the flux when being heat up to be discharged.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
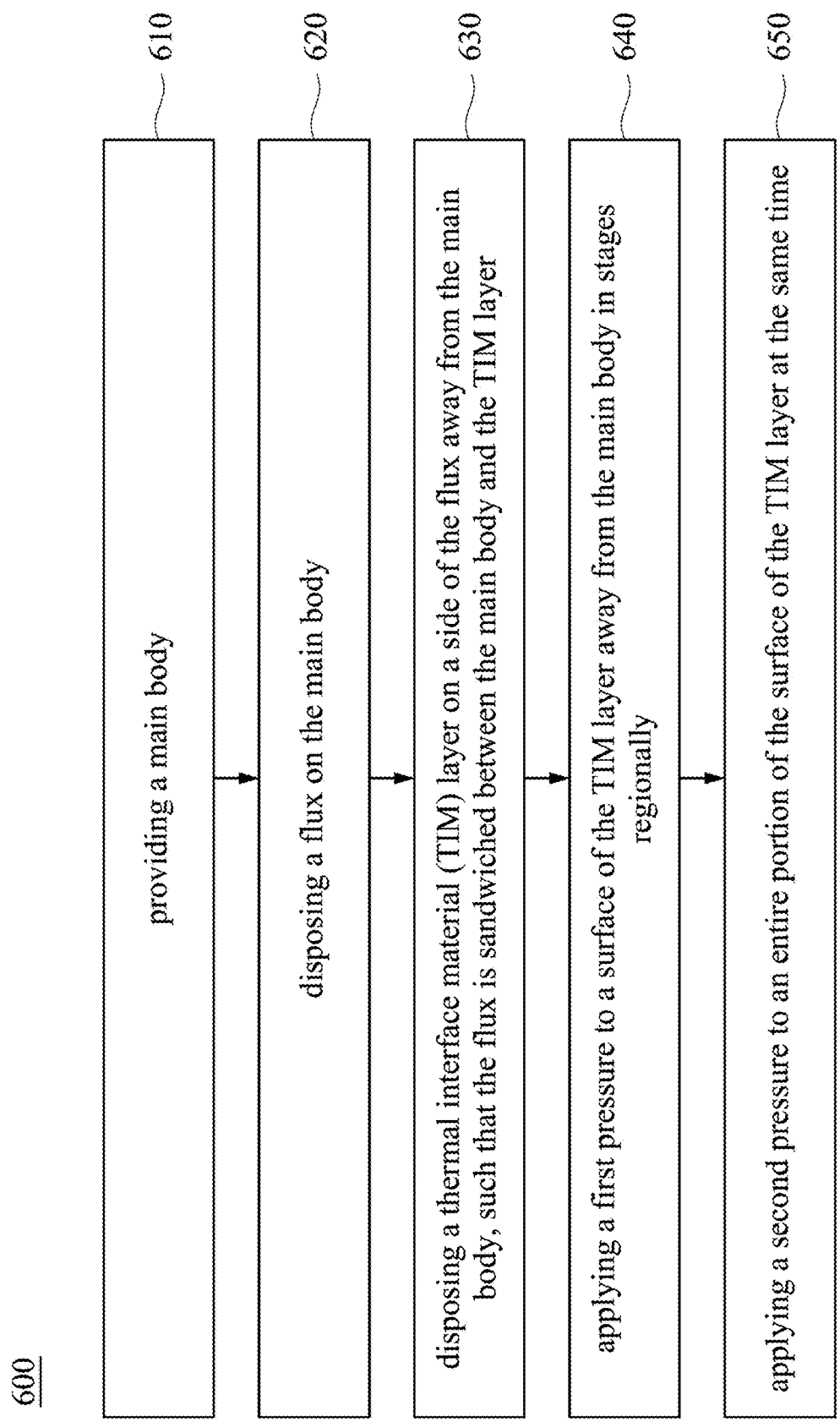
FIG. 1 is a flow chart of a method of manufacturing heat dissipation module according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a flow chart of a method 600 of manufacturing heat dissipation module according to an embodiment of the present disclosure. In this embodiment, as shown in FIG. 1, the method 600 of manufacturing heat dissipation module includes the following procedures, which should be understood that the order of procedures mentioned below can be changed as per actual requirements, and some of the procedures may be executed simultaneously or partially simultaneously unless their sequence is explicitly stated:

(1) Procedure 610: providing a main body.

(2) Procedure 620: disposing a flux on the main body.

(3) Procedure 630: disposing a thermal interface material (TIM) layer on a side of the flux away from the main body, such that the flux is sandwiched between the main body and the TIM layer. To be specific, the TIM layer can be heat dissipation glue, indium or indium alloy sheet and graphene. However, this does not intend to limit the present disclosure.

(4) Procedure 640: applying a first pressure to a surface of the TIM layer away from the main body in stages regionally.

Figure 2:
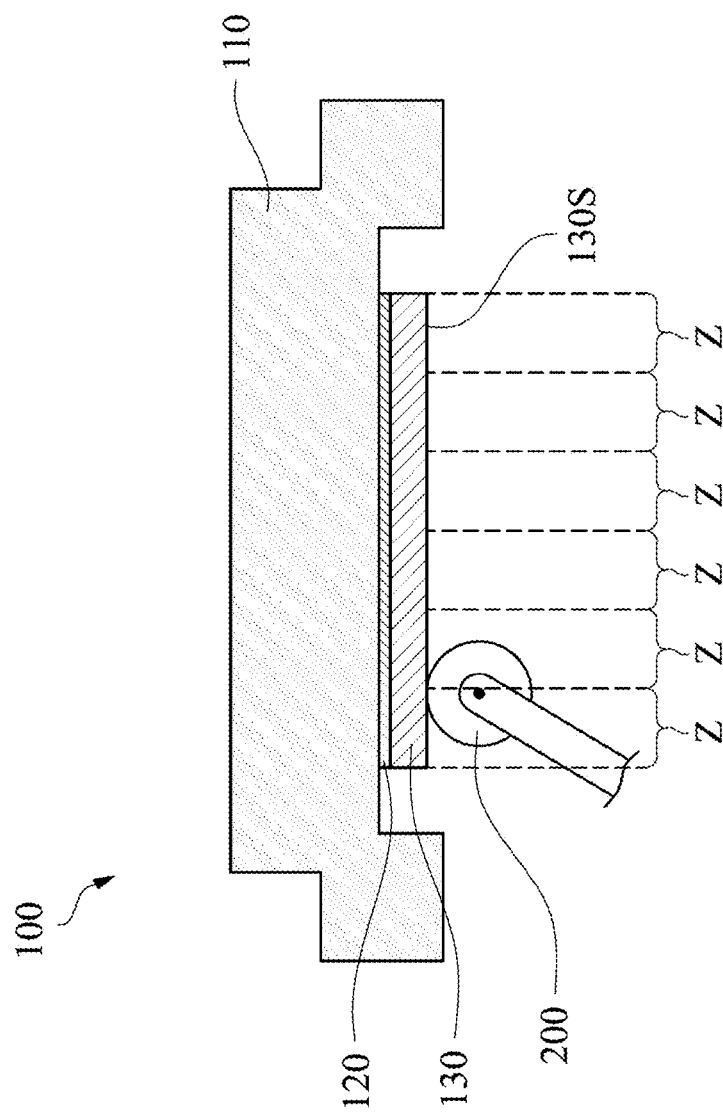
FIG. 2 is a sectional view of the heat dissipation module of FIG. 1, in which the heat dissipation module is undergoing the first stage of pre-compression.

Reference is made to FIG. 2. FIG. 2 is a sectional view of the heat dissipation module 100 of FIG. 1, in which the heat dissipation module 100 is undergoing the first stage of pre-compression. In this embodiment, as shown in FIG. 2, the heat dissipation module 100 includes a main body 110, a flux 120 and a TIM layer 130. The flux 120 is sandwiched between the main body 110 and the TIM layer 130. The heat dissipation module 100 is undergoing the first stage of pre-compression, this means a first pressure is being applied to a surface 130S of the TIM layer 130 away from the main body 110 in stages regionally, in order to push away any void(s) formed between the TIM layer 130 and the main body 110 due to improper contact. Consequently, the fitness of contact between the TIM layer 130 and the main body 110 is enhanced. In practical applications, the main body 110 can be a heat spreader, a vapor chamber and a cold plate.

To be specific, the surface 130S of the TIM layer 130 is divided into a plurality of regions Z. The procedure of applying the first pressure in stages regionally as mentioned above means applying the first pressure to the regions Z one by one, in order to effectively remove any void(s) possibly formed between the TIM layer 130 and the main body 110. For example, as shown in FIG. 2, the procedure of applying the first pressure in stages regionally can be achieved by rolling on the surface 130S of the TIM layer 130 by a roller 200 to apply the first pressure to the regions Z on the surface 130S one by one. However, this does not intend to limit the present disclosure.

In addition, in order to improve the effect to remove the void(s), during the first stage of pre-compression, the first pressure applied to the surface 130S of the TIM layer 130 can be adjusted according to the actual situation. In other words, the first pressure applied to each of the regions Z can be different according to the actual situation.

Figure 3:
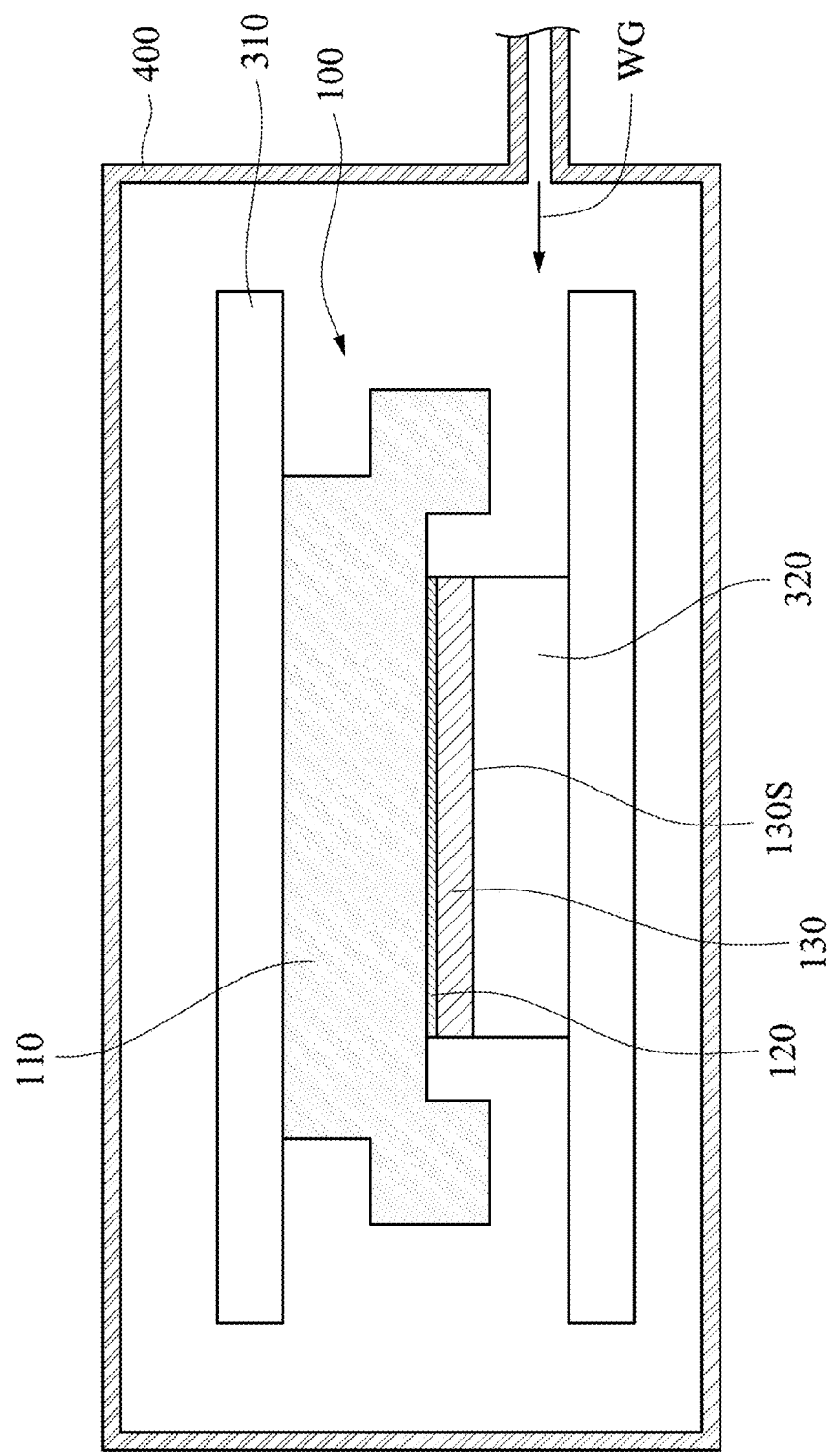
FIG. 3 is a sectional view of the heat dissipation module of FIG. 2, in which the heat dissipation module is undergoing the second stage of final compression.

Moreover, the method 600 of manufacturing heat dissipation module further includes the following procedure:

(5) Procedure 650: applying a second pressure to an entire portion of the surface 130S of the TIM layer 130 at the same time. Reference is made to FIG. 3. FIG. 3 is a sectional view of the heat dissipation module 100 of FIG. 2, in which the heat dissipation module 100 is undergoing the second stage of final compression. In the procedure 650, as shown in FIG. 3, the heat dissipation module 100 is undergoing the second stage of final compression, this means a second pressure is being applied to the entire portion of the surface 130S of the TIM layer 130 at the same time. To be specific, the procedure 650 includes: pressing on the main body 110 by a first pressing tool 310; and pressing on the entire portion of the surface 130S by a second pressing tool 320, in which the second pressing tool 320 at least partially aligns with the first pressing tool 310. In other words, the first pressing tool 310 and the second pressing tool 320 press towards each other. In this way, the fitness of contact between the main body 110 and the TIM layer 130 is effectively enhanced.

In practical applications, in order to improve the fitness of contact between the main body 110 and the TIM layer 130, when the heat dissipation module 100 is undergoing the second stage of final compression, the flux 120 can be heat up to a certain temperature and maintained at this temperature for a time period. In practice, a range of this temperature can be between 145 and 170 degree Celsius, while a range of this time period can be between 2 and 3 minutes. However, this does not intend to limit the present disclosure. For example, when the heat dissipation module 100 is undergoing the second stage of final compression, the flux 120 can be heat up to 145 degree Celsius for approximately 3 minutes, or 170 degree Celsius for approximately 2 minutes.

In practical applications, the flux 120 will produce a gas after being heat up. However, since the first pressing tool 310 and the second pressing tool 320 press towards each other, the gas produced from the flux 120 can be removed away from the main body 110 and the TIM layer 130 therebetween. Moreover, it should be noted that, during the second stage of final compression, the main body 110 is not in contact with any printed circuit board as in the traditional approach. In other words, in this embodiment, the flux 120 is not located in the confined space formed by the main body 110 and the printed circuit board, which facilitates the gas produced from the flux 120 when being heat up to be discharged.

Furthermore, as shown in FIG. 3, the second stage of final compression can be carried out in a chamber 400. At this point, in order to improve the fitness of contact between the main body 110 and the TIM layer 130, a working gas WG can be provided in the chamber 400. For example, the working gas WG includes nitrogen and formic acid. However, this does not intend to limit the present disclosure.

In practical applications, when the main body 110 and the TIM layer 130 are properly fixed to each other, the manufacture of the heat dissipation module 100 is completed. The heat dissipation module 100 can be applied, but not limited, to product series such as semiconductor packaging elements, light emitting diodes (LEDs) and lead frames (LFs).

Figure 4:
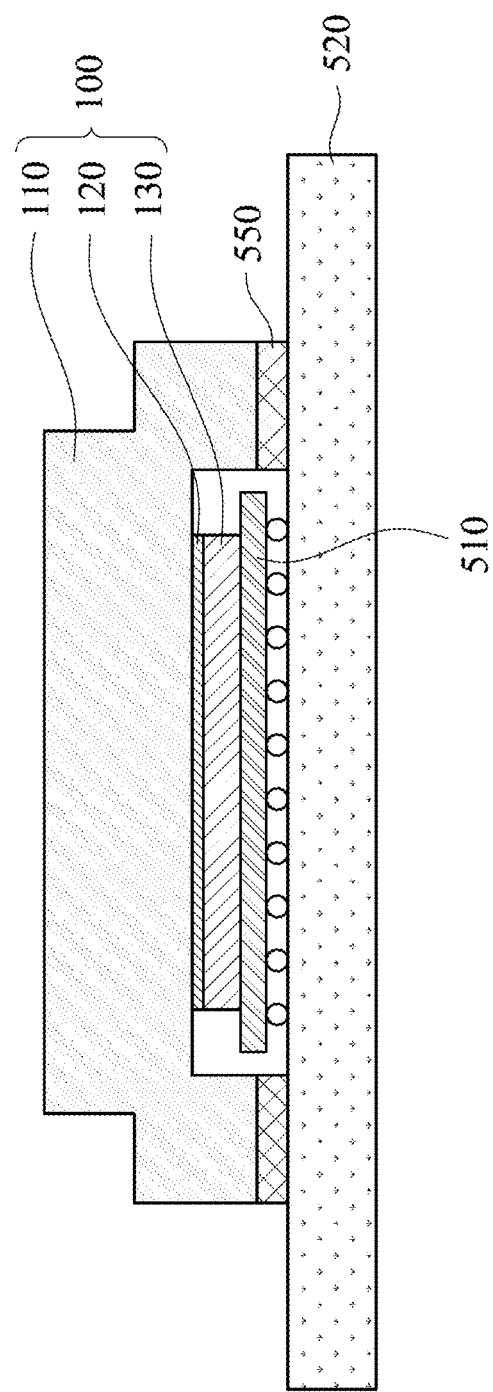
FIG. 4 is a sectional view of the application of the heat dissipation module of FIG. 3, in which the heat dissipation module is being packaged and bonded with a chip.

Reference is made to FIG. 4. FIG. 4 is a sectional view of the application of the heat dissipation module 100 of FIG. 3, in which the heat dissipation module 100 is being packaged and bonded with a chip 510. In this embodiment, as shown in FIG. 4, the heat dissipation module 100 can be packaged and bonded with a chip 510. To be specific, the main body 110 can be connected to the printed circuit board 520 through an adhesive 550, and the TIM layer 130 abuts against the chip 510 disposed on the printed circuit board 520. The heat dissipation module 100 can carry out heat dissipation to the chip 510.

In other embodiments, according to actual situations, the flux 120 mentioned above is not an essential element. This means the heat dissipation module 100 does not include the flux 120. In this case, the main body 110 and the TIM layer 130 directly contact with each other.

In conclusion, the aforementioned embodiments of the present disclosure have at least the following advantages:

(1) During the first stage of pre-compression, the first pressure is being applied to the surface of the TIM layer away from the main body in stages regionally, such that any void(s) formed between the TIM layer and the main body due to improper contact can be pushed away. Consequently, the fitness of contact between the TIM layer and the main body is enhanced.

(2) During the second stage of final compression, a second pressure is applied to the entire portion of the surface of the TIM layer, such that the fitness of contact between the main body and the TIM layer is effectively enhanced.

(3) During the second stage of final compression, the main body is not in contact with any printed circuit board as in the traditional approach. This means, the flux is not located in the confined space formed by the main body and the printed circuit board, which facilitates the gas produced from the flux when being heat up to be discharged.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method of manufacturing a heat dissipation module, the method comprising:
   providing a main body;
   disposing a thermal interface material (TIM) layer on the main body;
   applying a first pressure to a surface of the TIM layer away from the main body in stages regionally;
   applying a second pressure to an entire portion of the surface at a same time after the first pressure is applied; and
   abutting the surface against a chip after the second pressure is applied.

2. The method of claim 1, wherein the surface is divided into a plurality of regions, and applying the first pressure comprises:
   applying the first pressure to the regions one by one.

3. The method of claim 1, wherein applying the first pressure comprises:
   rolling on the surface by a roller to apply the first pressure to the surface regionally.

4. The method of claim 1, wherein applying the first pressure comprises:
   adjusting the first pressure applied to the surface.

5. The method of claim 1, wherein applying the second pressure comprises:
   pressing on the main body by a first pressing tool; and
   pressing on the entire portion of the surface by a second pressing tool, wherein the second pressing tool at least partially aligns with the first pressing tool.

6. The method of claim 1, further comprising:
   disposing a flux between the main body and the TIM layer.

7. The method of claim 6, wherein applying the second pressure comprises:
   heating up the flux.

8. The method of claim 7, wherein heating up the flux comprises:
   heating up the flux to a temperature, wherein a range of the temperature is between 145 and 170 degree Celsius.

9. The method of claim 8, wherein heating up the flux comprises:

maintaining the temperature within a time period, wherein a range of the time period is between 2 and 3 minutes.

10. The method of claim 7, wherein applying the second pressure comprises:
applying the second pressure in a chamber,
the method further comprises:
providing a working gas in the chamber.

11. The method of claim 10, wherein the working gas includes nitrogen and formic acid.

12. A method of manufacturing a heat dissipation module, the method comprising:
providing a main body;
disposing a flux on the main body;
disposing a thermal interface material (TIM) layer on a side of the flux away from the main body;
applying a first pressure to a surface of the TIM layer away from the main body in stages regionally;
applying a second pressure to an entire portion of the surface at a same time after the first pressure is applied; and
abutting the surface against a chip after the second pressure is applied.

13. The method of claim 12, wherein the surface is divided into a plurality of regions, and applying the first pressure comprises:
applying the first pressure to the regions one by one.

14. The method of claim 12, wherein applying the first pressure comprises:
rolling on the surface by a roller to apply the first pressure to the surface regionally.

15. The method of claim 12, wherein applying the first pressure comprises:
adjusting the first pressure applied to the surface.

16. The method of claim 12, wherein applying the second pressure comprises:
pressing on the main body by a first pressing tool; and
pressing on the entire portion of the surface by a second pressing tool, wherein the second pressing tool at least partially aligns with the first pressing tool.

17. The method of claim 12, wherein applying the second pressure comprises:
heating up the flux.

18. The method of claim 17, wherein heating up the flux comprises:
heating up the flux to a temperature, wherein a range of the temperature is between 145 and 170 degree Celsius.

19. The method of claim 18, wherein heating up the flux comprises:
maintaining the temperature within a time period, wherein a range of the time period is between 2 and 3 minutes.

20. The method of claim 17, wherein applying the second pressure comprises:
applying the second pressure in a chamber,
the method further comprises:
providing a working gas in the chamber.

21. The method of claim 20, wherein the working gas includes nitrogen and formic acid.

* * * * *